United States Patent
Ueno et al.

(10) Patent No.: US 10,174,671 B2
(45) Date of Patent: Jan. 8, 2019

(54) CONTROL DEVICE, METHOD, AND INTERNAL COMBUSION ENGINE

(71) Applicant: HONDA MOTOR CO., LTD., Tokyo (JP)

(72) Inventors: Masaki Ueno, Wako (JP); Masaaki Nagashima, Wako (JP); Masaki Suzuki, Wako (JP); Hidekazu Hironobu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 15/339,940

(22) Filed: Nov. 1, 2016

(65) Prior Publication Data
US 2017/0184014 A1 Jun. 29, 2017

(30) Foreign Application Priority Data
Dec. 25, 2015 (JP) .................................. 2015-254731

(51) Int. Cl.
*H02P 9/00* (2006.01)
*F02B 37/18* (2006.01)
(Continued)

(52) U.S. Cl.
CPC ............ *F02B 37/186* (2013.01); *F02B 37/10* (2013.01); *F02B 39/10* (2013.01); *F02B 63/04* (2013.01);
(Continued)

(58) Field of Classification Search
CPC .................. H02P 9/10; H02P 9/08; H02P 6/20
(Continued)

(56) References Cited

U.S. PATENT DOCUMENTS

2007/0256666 A1* 11/2007 Cunningham ........ F02B 25/145
123/445
2008/0011278 A1* 1/2008 Yamagata ............... F02D 23/00
123/562
(Continued)

FOREIGN PATENT DOCUMENTS

JP 2012-229666 11/2012
JP 2016-056800 4/2016

OTHER PUBLICATIONS

Japanese Office Action for corresponding JP Application No. 2015-254731, dated Aug. 29, 2017 (w/ English machine translation).

Primary Examiner — Julio C. Gonzalez
(74) Attorney, Agent, or Firm — Mori & Ward, LLP

(57) ABSTRACT

A control device for an internal combustion engine including a supercharger and a waste gate valve, the supercharger including a compressor an electric motor, and a turbine, the turbine being provided in an exhaust passage of the internal combustion engine, the waste gate valve being provided in a bypass passage that bypasses the turbine, the control device includes circuitry. The circuitry is configured to drive the electric motor in a high-load operation state in which the load of the internal combustion engine is determined to be equal to or larger than a first reference load and the temperature of the exhaust gas is determined to be expected to be higher than a reference temperature. The circuitry is configured to increase an opening degree of the waste gate valve in the high-load operation state.

2 Claims, 5 Drawing Sheets

(51) Int. Cl.
*F02P 9/00* (2006.01)
*F02B 37/10* (2006.01)
*F02B 63/04* (2006.01)
*F02D 41/00* (2006.01)
*F02D 41/14* (2006.01)
*H02K 7/18* (2006.01)
*H02P 9/14* (2006.01)
*F02B 39/10* (2006.01)

(52) U.S. Cl.
CPC ..... *F02D 41/0007* (2013.01); *F02D 41/1446* (2013.01); *F02P 9/00* (2013.01); *H02K 7/1815* (2013.01); *H02P 9/14* (2013.01); *F02D 41/1447* (2013.01); *F02D 2041/1412* (2013.01); *Y02T 10/144* (2013.01)

(58) Field of Classification Search
USPC ................... 322/44, 56, 20; 290/40 B, 40 R
See application file for complete search history.

(56) References Cited

U.S. PATENT DOCUMENTS

| | | | |
|---|---|---|---|
| 2009/0320468 A1* | 12/2009 | Shimizu | F02B 37/10 60/608 |
| 2014/0352663 A1* | 12/2014 | Glugla | F02D 41/0085 123/443 |
| 2015/0013331 A1* | 1/2015 | Nakasaka | F02D 11/105 60/602 |
| 2015/0184587 A1* | 7/2015 | Komiya | F02B 37/18 123/568.21 |
| 2015/0285191 A1* | 10/2015 | Kitada | H01M 8/04201 60/605.2 |
| 2016/0076438 A1* | 3/2016 | Tabata | F02D 41/0007 60/602 |
| 2016/0265422 A1* | 9/2016 | Yamashita | F01N 5/04 |
| 2017/0145934 A1* | 5/2017 | Schnorpfeil | F02D 41/0007 |
| 2017/0159552 A1* | 6/2017 | Suzuki | F02B 37/11 |
| 2017/0276059 A1* | 9/2017 | Hotta | F01P 3/18 |

* cited by examiner

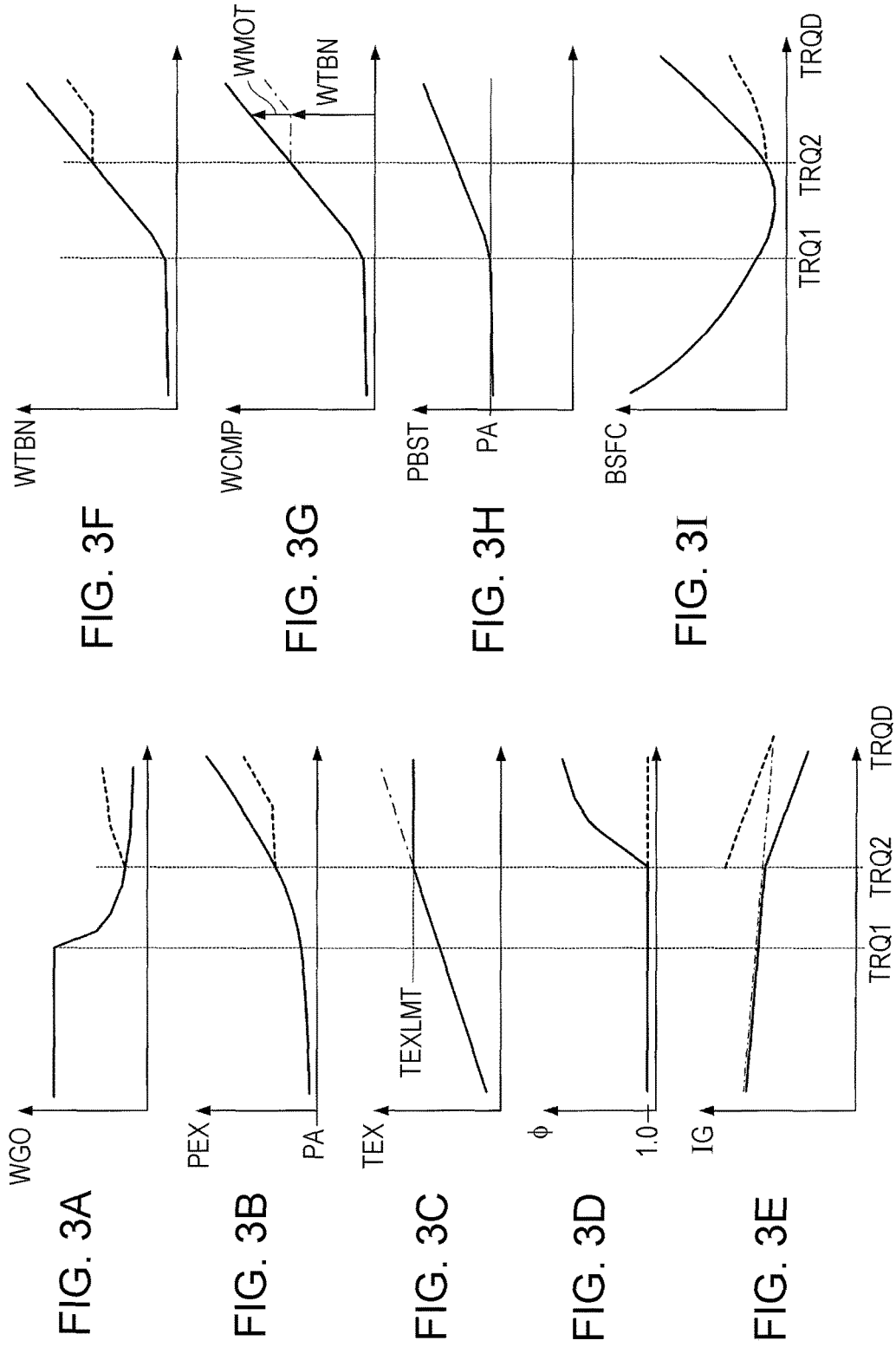

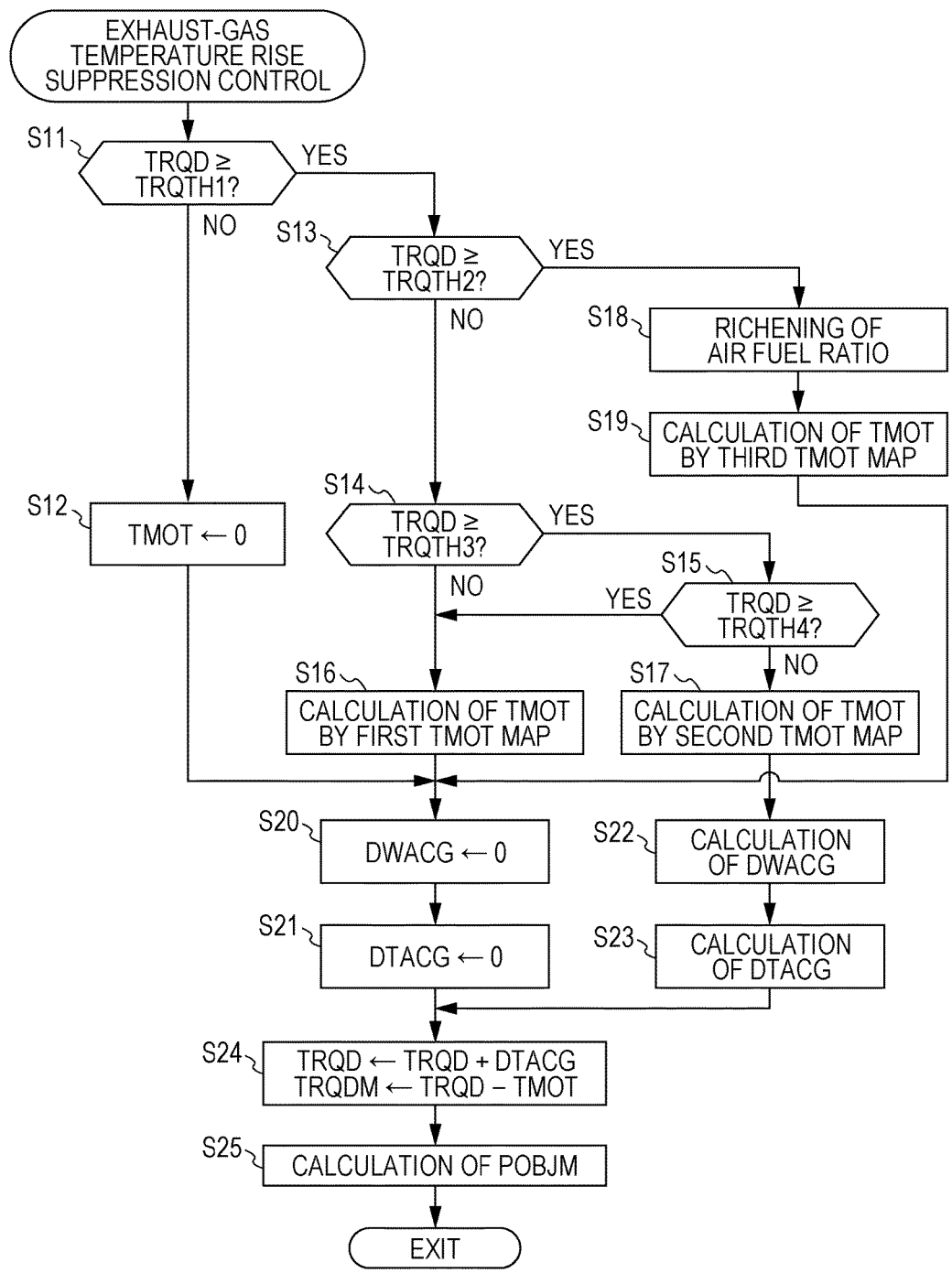

CONTROL DEVICE, METHOD, AND INTERNAL COMBUSION ENGINE

CROSS-REFERENCE TO RELATED APPLICATIONS

The present application claims priority under 35 U.S.C. § 119 to Japanese Patent Application No. 2015-254731, filed Dec. 25, 2015, entitled "Control Device of Internal Combustion Engine." The contents of this application are incorporated herein by reference in their entirety.

BACKGROUND

1. Field

The present disclosure relates to a control device, a method, and an internal combustion engine.

2. Description of the Related Art

An excessive rise in the exhaust-gas temperature of an internal combustion engine provided with a supercharger results in an excessive rise in a turbine rotation speed and a supercharging pressure and increases the likelihood of a breakdown of the internal combustion engine. Therefore, as described in Japanese Unexamined Patent Application Publication No. 2012-229666, for example, a control technique of richening the air fuel ratio if there is a possibility of an excessive rise in an exhaust-gas temperature is known. Richening of the air fuel ratio brings about a decrease in the combustion temperature, which makes it possible to suppress a rise in the exhaust-gas temperature.

SUMMARY

According to a first aspect of the present disclosure, a control device of an internal combustion engine provided with a supercharger and a waste gate valve, the supercharger including a turbine provided in an exhaust passage of the internal combustion engine, a compressor that is driven and rotated by the turbine and pressurizes an intake air of the engine, and an electric motor provided so as to be capable of driving the compressor, the waste gate valve provided in a bypass passage that bypasses the turbine, the control device includes an exhaust-gas temperature rise suppression unit. The exhaust-gas temperature rise suppression unit drives the electric motor and makes larger an opening of the waste gate valve in a predetermined high-load operation state in which a load of the engine is a first predetermined load or higher and an excessive rise in an exhaust-gas temperature of the engine is estimated to occur.

According to a second aspect of the present disclosure, a control device for an internal combustion engine including a supercharger and a waste gate valve, the supercharger including a compressor, and an electric motor and a turbine which are to drive the compressor, the turbine being provided in an exhaust passage of the internal combustion engine, the waste gate valve being provided in a bypass passage that bypasses the turbine, the control device includes circuitry. The circuitry is configured to determine whether a load of the internal combustion engine is equal to or larger than a first reference load. The circuitry is configured to determine whether a temperature of an exhaust gas discharged from the internal combustion engine is expected to be higher than a reference temperature. The circuitry is configured to drive the electric motor in a high-load operation state in which the load of the internal combustion engine is determined to be equal to or larger than the first reference load and the temperature of the exhaust gas is determined to be expected to be higher than the reference temperature. The circuitry is configured to increase an opening degree of the waste gate valve in the high-load operation state.

According to a third aspect of the present disclosure, a method for controlling an internal combustion engine includes determining whether a load of the internal combustion engine is equal to or larger than a first reference load. Whether a temperature of an exhaust gas discharged from the internal combustion engine is expected to be higher than a reference temperature is determined. An electric motor is driven in a high-load operation state in which the load of the internal combustion engine is determined to be equal to or larger than the first reference load and the temperature of the exhaust gas is determined to be expected to be higher than the reference temperature. A supercharger of the internal combustion engine includes a compressor, and the electric motor and a turbine which are to drive the compressor. The turbine is provided in an exhaust passage of the internal combustion engine. An opening degree of the waste gate valve is increased in the high-load operation state. The waste gate valve is provided in a bypass passage that bypasses the turbine.

According to a fourth aspect of the present disclosure, a control device for an internal combustion engine including a supercharger and a waste gate valve, the supercharger including a compressor, and an electric motor and a turbine which are to drive the compressor, the turbine being provided in an exhaust passage of the internal combustion engine, the waste gate valve being provided in a bypass passage that bypasses the turbine, the control device includes means for determining whether a load of the internal combustion engine is equal to or larger than a first reference load. The control device includes means for determining whether a temperature of an exhaust gas discharged from the internal combustion engine is expected to be higher than a reference temperature. The control device includes means for driving the electric motor in a high-load operation state in which the load of the internal combustion engine is determined to be equal to or larger than the first reference load and the temperature of the exhaust gas is determined to be expected to be higher than the reference temperature. The control device includes means for increasing an opening degree of the waste gate valve in the high-load operation state.

According to a fifth aspect of the present disclosure, an internal combustion engine includes a supercharger, a waste gate valve, and circuitry. The supercharger includes a compressor, and an electric motor and a turbine which are to drive the compressor. The turbine is provided in an exhaust passage of the internal combustion engine. The waste gate valve is provided in a bypass passage that bypasses the turbine. The circuitry is configured to determine whether a load of the internal combustion engine is equal to or larger than a first reference load. The circuitry is configured to determine whether a temperature of an exhaust gas discharged from the internal combustion engine is expected to be higher than a reference temperature. The circuitry is configured to drive the electric motor in a high-load operation state in which the load of the internal combustion engine is determined to be equal to or larger than the first reference load and the temperature of the exhaust gas is determined to be expected to be higher than the reference temperature. The circuitry is configured to increase an opening degree of the waste gate valve in the high-load operation state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 3A to 3I are diagrams for explaining the outline of exhaust-gas temperature rise suppression control.

FIG. 5 is a flowchart of processing for performing the exhaust-gas temperature rise suppression control.

DESCRIPTION OF THE EMBODIMENTS

Figure 1:
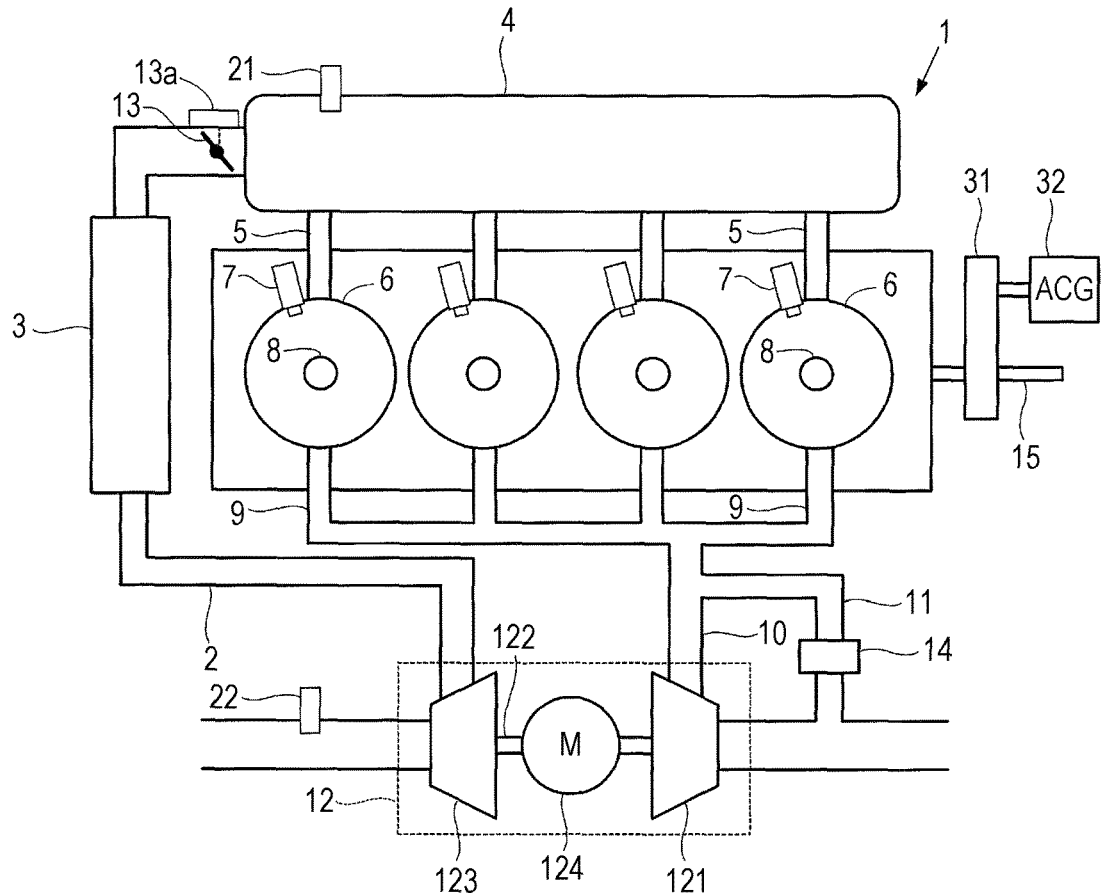
FIG. 1 is a diagram schematically depicting the configuration of an internal combustion engine according to one embodiment of the present disclosure.

The embodiments will now be described with reference to the accompanying drawings, wherein like reference numerals designate corresponding or identical elements throughout the various drawings.

FIG. 1 is a diagram schematically depicting the configuration of an internal combustion engine according to one embodiment of the present disclosure. An internal combustion engine (hereinafter referred to as an "engine") 1 is a direct-injection engine which has four cylinders 6 and directly injects fuel into combustion chambers of the cylinders 6, and, in each cylinder 6, a fuel injection valve 7, an ignition plug 8, and an inlet valve and an exhaust valve (none of which is depicted in the drawing) are provided.

The engine 1 includes an inlet passage 2, an exhaust passage 10, a turbocharger (a supercharger) 12, and a crank shaft (an output shaft) 15. The inlet passage 2 is connected to a surge tank 4, and the surge tank 4 is connected to the combustion chamber of each cylinder 6 via an inlet manifold 5. In the inlet passage 2, an inter cooler 3 for cooling the pressurized air and a throttle valve 13 are provided, and the throttle valve 13 is configured such that the throttle valve 13 can be driven by a throttle actuator 13a. In the surge tank 4, an intake pressure sensor 21 that detects an intake pressure PB is provided, and, in the inlet passage 2, an intake air flow sensor 22 that detects an intake air flow GAIR is provided.

The turbocharger 12 is provided in an exhaust passage 10 and includes a turbine 121 that is driven and rotated by kinetic energy of the exhaust air, a compressor 123 that is coupled to the turbine 121 via a shaft 122, and a motor (an electric motor) 124 that is provided so as to be capable of driving and rotating the shaft 122. The compressor 123 is provided in the inlet passage 2 and pressurizes (compresses) the air which is taken in the engine 1. As a result of the motor 124 being driven, driving assist (driving assistance) that assists the driving of the compressor 123 by the turbine 121 is performed. Hereinafter, this driving assistance is referred to as "motor assist".

The combustion chamber of each cylinder 6 of the engine 1 is connected to the exhaust passage 10 via an exhaust manifold 9. To the exhaust passage 10, a bypass passage 11 that bypasses the turbine 121 is connected, and, in the bypass passage 11, a waste gate valve 14 that controls the rate of flow of the exhaust air passing through the bypass passage 11 is provided.

The crank shaft 15 of the engine 1 is connected to an alternating-current generator (hereinafter referred to as an "ACG") 32 via a transfer mechanism 31, and the ACG 32 is driven by the engine 1. The ACG 32 charges a battery (not depicted in the drawing) and power is supplied to the motor 124 from the battery.

Figure 2:
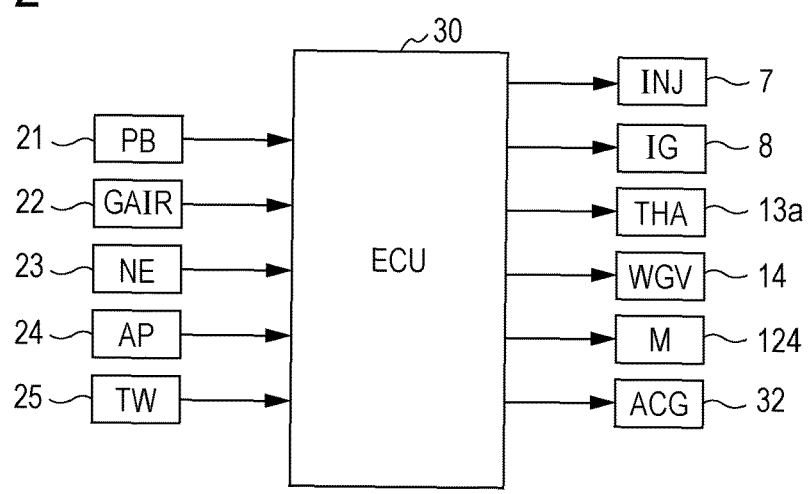
FIG. 2 is a block diagram depicting the configuration of a control system that performs control of the internal combustion engine depicted in FIG. 1.

FIG. 2 is a block diagram depicting the configuration of a control system that performs control of the engine 1, and, to an electronic control unit (hereinafter referred to as an "ECU") 30, in addition to the above-described intake pressure sensor 21 and intake air flow sensor 22, an engine RPM sensor 23 that detects the RPM NE of the engine 1, an accelerator sensor 24 that detects the amount by which an accelerator pedal (not depicted in the drawing) of a vehicle which is driven by the engine 1 is stepped on (hereinafter referred to as "the amount of operation of an accelerator pedal") AP, a cooling water temperature sensor 25 that detects an engine cooling water temperature TW, and other sensors which are not depicted in the drawing are connected, and the detected signals of these sensors are supplied to the ECU 30. To the output side of the ECU 30, the fuel injection valve 7, the ignition plug 8, the waste gate valve 14, the throttle actuator 13a, the motor 124, and the ACG 32 are connected.

The ECU 30 includes an input circuit having the function of, for example, shaping the input signal waveforms from the various sensors, modifying a voltage level to obtain a predetermined level, and converting an analog signal value to a digital signal value, a central processing unit (hereinafter referred to as a "CPU"), a memory circuit that stores various operation programs which are executed in the CPU, the operation results, and the like, and an output circuit that supplies a driving signal to the motor 124 and so forth.

In accordance with the engine operation state (mainly the engine RPM NE and required torque TRQD), the ECU 30 performs fuel injection control by the fuel injection valve 7, ignition control by the ignition plug 8, driving assist control of the turbocharger 12 by the motor 124, turbine driving control by the waste gate valve 14, and intake air mass control by the throttle valve 13. The required torque TRQD is calculated mainly in accordance with the amount of operation of an accelerator pedal AP and is calculated such that the required torque TRQD becomes higher with an increase in the amount of operation of an accelerator pedal AP.

In this embodiment, by performing motor assist in a high-load operation state in which the required torque TRQD is high, exhaust-gas temperature rise suppression control by which a rise in an exhaust-gas temperature TEX is suppressed is performed. Hereinafter, the outline of the control will be described with reference to FIGS. 3A to 3I.

All of the horizontal axes of FIGS. 3A to 3I represent the required torque TRQD (which is indicated in FIGS. 3E and 3I), and the relationships between the opening (hereinafter referred to as "WG opening") WGO of the waste gate valve 14, the exhaust pressure PEX, the exhaust-gas temperature TEX, the equivalence ratio Φ (a parameter which becomes "1.0" in terms of a theoretical air fuel ratio and is proportional to the reciprocal of the air fuel ratio AF), the ignition timing IG which is represented as the amount of advance from compression stroke end top dead center, the work done by the turbine WTBN, the work done by the compressor WCMP, the supercharging pressure PEST (the internal inlet passage pressure on the upstream side of the throttle valve 13), and the brake specific fuel consumption (hereinafter referred to as "BSFC") and the required torque TRQD are indicated. In these drawings, in an area in which the required torque TRQD is torque TRQ2 or higher, a solid line corresponds to a case where motor assist is not performed and a broken line corresponds to a case where motor assist is performed. Incidentally, since the exhaust-gas temperature TEX, the work done by the compressor WCMP, and the supercharging pressure PBST, which are indicated in FIGS. 3C, 3G, and 3H, in the case where motor assist is performed are the same as those in the case where motor assist is not performed, the broken line is not depicted in these drawings.

By making the WG opening WGO smaller in an area in which the required torque TRQD is higher than torque TRQ1, the turbine 121 is driven by exhaust energy and the compressor 123 is driven by the turbine 121, whereby supercharging is performed. As a result, the exhaust pressure PEX and the supercharging pressure PEST rise (FIGS. 3B and 3H).

If motor assist is not performed in an area in which the required torque TRQD is the torque TRQ2 or higher, since there is a need to make the WG opening WGO further smaller, the exhaust pressure PEX rises. Therefore, by performing richening of the air fuel ratio by which the equivalence ratio Φ is increased, a rise in the exhaust-gas temperature TEX is suppressed so as to be an upper limit temperature TEXLMT or lower (FIGS. 3C and 3D). If richening of the air fuel ratio is not performed, as indicated by an alternate long and short dashed line, the exhaust-gas temperature TEX further rises. Moreover, the ignition timing IG is retarded in order to prevent knocking (FIG. 3E). An alternate long and short dashed line indicated in FIG. 3E indicates optimum ignition timing MBT with which the engine output torque is maximized and, since this alternate long and short dashed line and the solid line overlap one another, the alternate long and short dashed line is depicted so as to lie slightly off the solid line.

On the other hand, if motor assist is performed in an area in which the required torque TRQD is the torque TRQ2 or higher, it is possible to reduce the work WTBN done by the turbine 121 by an amount corresponding to work to be assisted and make up for that amount by motor assist (WMOT) (FIG. 3G) and make the WG opening WGO larger (FIG. 3A). As a result, it is possible to avoid a rise in the exhaust-gas temperature TEX by making the exhaust pressure PEX lower than the pressure indicated by the solid line, which eliminates the need to perform richening of the air fuel ratio. Moreover, a reduction of the exhaust pressure PEX results in a reduction of the high-temperature residual gas which remains in the combustion chamber after combustion, which makes knocking less likely to occur and makes it possible to advance the ignition timing IG as indicated by the broken line in FIG. 3E or reduce the amount of retardation as compared to the ignition timing indicated by the solid line. This point also contributes to suppression of a rise in the exhaust-gas temperature TEX. By not performing richening of the air fuel ratio and advancing the ignition timing IG or reducing the amount of retardation, it is possible to obtain the fuel efficiency improvement effect by which BSFC is reduced (FIG. 3I).

Since the execution of motor assist consumes the power of a battery, the time in which motor assist can be performed is limited by the amount of electricity stored in the battery. Thus, by making motor output torque TMOT higher by increasing the power generation amount WACG of the ACG 32 or lengthening the time in which the motor output torque TMOT which has been made higher is maintained, it is possible to achieve a further improvement in the BSFC. Changes in the BSFC caused by making the motor output torque TMOT higher by increasing the power generation amount WACG of the ACG 32 will be explained with reference to FIGS. 4A to 4C.

Figure 4A:
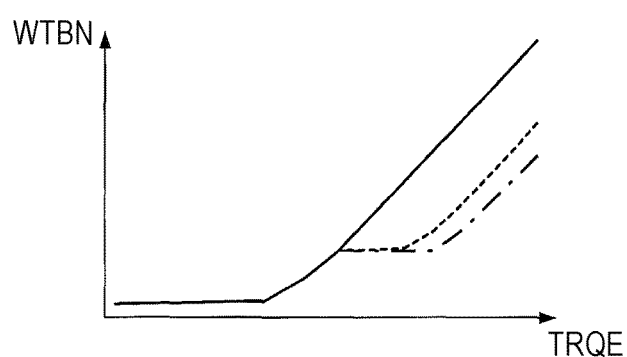
FIGS. 4A to 4C are diagrams for explaining changes in the brake specific fuel consumption (BSFC) caused as a result of the power generation amount of a generator being increased.
Figure 4B:
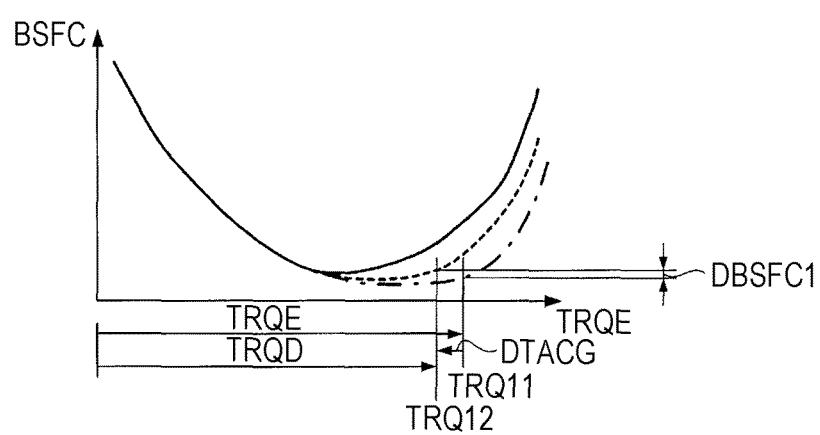
Figure 4C:
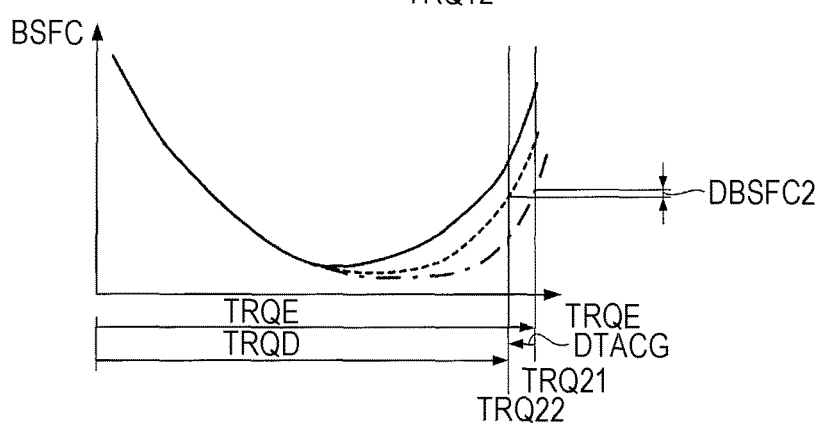

FIG. 4A depicts the relationship between engine output torque TRQE and the work done by the turbine WTBN and FIGS. 4B and 4C depict the relationship between the engine output torque TRQE and the BSFC. In each drawing, a solid line corresponds to a case without motor assist and a broken line and an alternate long and short dashed line correspond to a case with motor assist. Moreover, FIG. 4B corresponds to a case where the ACG power generation amount WACG is a normal power generation amount WACGN, and FIG. 4C corresponds to a case where the ACG power generation amount WACG is a maximum power generation amount WACGMAX which is larger than the normal power generation amount WACGN.

As depicted in FIG. 4A, by performing motor assist, it is possible to reduce the work done by the turbine WTBN (the broken line and the alternate long and short dashed line), and, by setting the ACG power generation amount at the maximum power generation amount WACGMAX, it is possible to further reduce the work done by the turbine WTBN (the alternate long and short dashed line) by making the motor output torque TMOT higher than a case (the broken line) where the ACG power generation amount is set at the normal power generation amount WACGN.

FIG. 4B corresponds to a case where the required torque TRQD is torque TRQ12. To make effective output torque TRQEF (torque which contributes to the driving of a vehicle) of the engine 1 equal to the required torque TRQD, it is necessary to add an increase DTACG in the driving torque of the ACG 32, which makes it necessary to set the engine output torque TRQE at torque TRQ11. Therefore, the BSFC improvement effect is indicated by DBSFC1 depicted in FIG. 4B. Incidentally, in the example depicted in the drawing, it is assumed that the effective output torque TRQEF (=TRQE−DTACG) contains ACG driving torque in a state in which the ACG power generation amount is set at the normal power generation amount WACGN.

FIG. 4C corresponds to a case where the required torque TRQD is torque TRQ22. To make the effective output torque TRQEF of the engine 1 equal to the torque TRQ22, it is necessary to set the engine output torque TRQE at torque TRQ21. Therefore, by setting the ACG power generation amount WACG at the maximum power generation amount WACGMAX, the BSFC is decreased by DBSFC2 as compared to a case where the ACG power generation amount WACG is set at the normal power generation amount WACGN.

The above description confirms that the BSFC improvement effect obtained by increasing the ACG power generation amount WACG so as to be larger than the normal power generation amount WACGN can be achieved only when the required torque TRQD is within a relatively high-load range in which motor assist is performed and within a predetermined torque range included in that high-load range.

FIG. 5 is a flowchart of processing for performing the above-described exhaust-gas temperature rise suppression control. This processing is performed in the ECU 30 at intervals of a given amount of time.

In Step S11, it is judged whether or not the required torque TRQD is first predetermined torque TRQTH1 or higher; if the answer is the negative (NO), the motor output torque TMOT is set at "0" and motor assist is not performed (Step S12). After the execution of Step S12, the procedure proceeds to Step S20. The first predetermined torque TRQTH1 corresponds to the torque TRQ2 depicted in FIGS. 3A to 3I and is a threshold value for judging the high-load operation state in which motor assist has to be performed.

If the answer in Step S11 is the affirmative (YES), it is judged whether or not the required torque TRQD is second predetermined torque TRQTH2, which is higher than the first predetermined torque TRQTH1, or higher (Step S13). The second predetermined torque TRQTH2 is a threshold value for judging an operation state (hereinafter referred to as a "particular high-load operation state") in which richening of the air fuel ratio, along with motor assist, has to be performed to suppress a rise in the exhaust-gas temperature TEX.

If the answer in Step S13 is the negative (NO) and TRQTH1≤TRQD<TRQTH2 holds, it is judged whether or not the required torque TRQD is third predetermined torque TRQTH3 or higher (Step S14). The third predetermined torque TRQTH3 is set at a value which is greater than the first predetermined torque TRQTH1 and smaller than the second predetermined torque TRQTH2. If the answer in Step S14 is the affirmative (YES), it is judged whether or not the required torque TRQD is fourth predetermined torque TRQTH4 or higher (Step S15). The fourth predetermined torque TRQTH4 is set at a value which is greater than the third predetermined torque TRQTH3 and smaller than the second predetermined torque TRQTH2. That is, the first to fourth predetermined torque TRQTH1 to TRQTH4 are set so as to satisfy the relationship of the following expression (1). The third predetermined torque TRQTH3 and the fourth predetermined torque TRQTH4 are threshold values that define the predetermined torque range explained with reference to FIGS. 4A to 4C and are set such that the BSFC improvement effect can be obtained by increasing the ACG power generation amount WACG within the predetermined torque range.

$$TRQTH1<TRQTH3<TRQTH4<TRQTH2 \qquad (1)$$

If the answer in Step S14 is the negative (NO) or the answer in Step S15 is the affirmative (YES), that is, if the required torque TRQD is the first predetermined torque TRQTH1 or higher but lower than the third predetermined torque TRQTH3 or is the fourth predetermined torque TRQTH4 or higher but lower than the second predetermined torque TRQTH2, the procedure proceeds to Step S16, and a first TMOT map is searched in accordance with the engine RPM NE and the required torque TRQD, whereby the motor output torque TMOT is calculated (Step S16). The first TMOT map is a motor output torque calculation map that is used when the ACG power generation amount WACG is set at the normal power generation amount WACGN. The driving current of the motor 124 is controlled such that the effective output torque of the motor 124 becomes the calculated motor output torque TMOT.

In subsequent Step S20, an additional power generation amount DWACG of the ACG 32 is set at "0", and, in Step S21, an additional ACG driving torque DTACG corresponding to the additional power generation amount DWACG is set at "0". That is, the power generation amount WACG of the ACG 32 is maintained at the normal power generation amount WACGN. After the execution of Step S21, the procedure proceeds to Step S24.

If the answer in Step S15 is the negative (NO), that is, if the required torque TRQD is the third predetermined torque TRQTH3 or higher but lower than the fourth predetermined torque TRQTH4, a second TMOT map is searched in accordance with the engine RPM NE and the required torque TRQD, whereby the motor output torque TMOT is calculated (Step S17). The second TMOT map is a motor output torque calculation map that is used when the ACG power generation amount WACG is set at the maximum power generation amount WACGMAX, and a set value in each grid point of the second TMOT map is set at a value which is greater than a set value in a corresponding grid point on the first TMOT map.

In Step S22, a DWACG map is searched in accordance with the engine RPM NE and the required torque TRQD, whereby the additional power generation amount DWACG is calculated; in Step S23, the ACG driving torque DTACG is calculated in accordance with the additional power generation amount DWACG. The ACG driving torque DTACG is calculated such that the ACG driving torque DTACG becomes higher as the additional power generation amount DWACG increases. The additional power generation amount DWACG corresponds to a differential between the maximum power generation amount WACGMAX and the normal power generation amount WACGN. After the execution of Step S23, the procedure proceeds to Step S24.

If the answer in Step S13 is the affirmative (YES) and the engine 1 is in the particular high-load operation state, richening by which the air fuel ratio is set at an air fuel ratio on a richer side than the theoretical air fuel ratio is performed (Step S18), and a third TMOT map is searched in accordance with the engine RPM NE and the required torque TRQD, whereby the motor output torque TMOT is calculated (Step S19). The third TMOT map is a map in which the motor output torque TMOT corresponding to the particular high-load operation state is set. After the execution of Step S19, the procedure proceeds to Step S20.

In Step S24, the required torque TRQD is updated by the following expression (2), and, by substituting the updated required torque TRQD into the following expression (3), a modified required torque TRQDM is calculated.

$$TRQD=TRQD+DTACG \qquad (2)$$

$$TRQDM=TRQD-TMOT \qquad (3)$$

In Step S25, a modified target supercharging pressure POBJM is calculated in accordance with the engine RPM NE and the modified required torque TRQDM. The calculated modified target supercharging pressure POBJM is applied to control of the WG opening WGO. Since the modified target supercharging pressure POBJM becomes a value smaller than a target supercharging pressure POBJ which is calculated in accordance with the required torque TRQD, control is performed such that the WG opening WGO is made smaller. If motor assist is not performed and the modified target supercharging pressure POBJM is equal to the target supercharging pressure POBJ, normal WG opening control is performed. Moreover, intake air flow control, fuel injection control, and ignition timing control are performed in accordance with the updated required torque TRQD.

Figure 6:
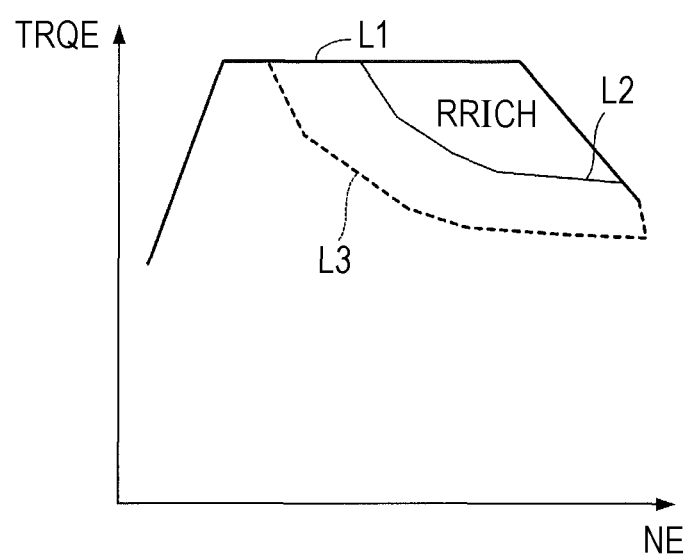
FIG. 6 is a diagram for explaining the effect obtained by performing the exhaust-gas temperature rise suppression control.

FIG. 6 is a diagram for explaining the effect obtained by performing the exhaust-gas temperature rise suppression control including motor assist, and an engine operation area defined by the engine RPM NE and the engine output torque TRQE is indicated. A solid line L1 indicates maximum torque corresponding to the engine RPM NE, and an area surrounded by the solid line L1 and a broken line L3 indicates an operation area in which richening of the air fuel ratio in a case where the exhaust-gas temperature rise suppression control including motor assist is not performed has to be performed, and an area RRICH surrounded by the solid lines L1 and L2 is an operation area in which richening of the air fuel ratio in a case where the exhaust-gas temperature rise suppression control including motor assist is performed has to be performed. As described above, by performing the exhaust-gas temperature rise suppression control by which motor assist is performed and the WG opening WGO is made larger, it is possible to make narrower the operation area in which richening of the air fuel ratio has to be performed and thereby improve the fuel efficiency.

As described above, in this embodiment, in the predetermined high-load operation state in which the required torque TRQD indicating the load of the engine 1 is the first predetermined torque TRQTH1 or higher and it is estimated that the exhaust-gas temperature TEX excessively rises, the exhaust-gas temperature rise suppression control by which motor assist that is carried out by the driving of the motor 124 is performed and the opening WGO of the waste gate valve 14 is made larger is performed. By performing driving assistance to the compressor 123 by the motor 124 in the predetermined high-load operation state in which the required torque TRQD is relatively high, even when the work done by the turbine is reduced by making larger the opening WGO of the waste gate valve 14, it is possible to achieve the supercharging pressure rising characteristics that are equal to the characteristics observed when the waste gate valve 14 is closed. Since it is possible to suppress a rise in the exhaust-gas temperature TEX by reducing the exhaust pressure PEX by making larger the opening WGO of the waste gate valve 14, as indicated by the broken line in FIG. 3D, it is possible to improve the fuel efficiency by suppressing a rise in the exhaust-gas temperature TEX without performing richening of the air fuel ratio. Moreover, since the high-temperature residual gas in the combustion chamber is reduced as a result of a reduction of the exhaust pressure PEX, which makes knocking less likely to occur, it is possible to reduce the amount of retardation of the ignition timing IG (and also possible to advance the ignition timing IG), which also contributes to the suppression of a rise in an exhaust-gas temperature.

Furthermore, in the particular high-load operation state in which the required torque TRQD is the second predetermined torque TRQTH2, which is higher than the first predetermined torque TRQTH1, or higher, richening of the air fuel ratio is performed. In an operation state in which the required torque TRQD is very high, since a higher priority has to be given to the suppression of a rise in the exhaust-gas temperature TEX than to the prevention of a decrease in fuel efficiency, by performing richening of the air fuel ratio while performing motor assist and making larger the opening WGO of the waste gate valve, it is possible to prevent an excessive rise in the exhaust-gas temperature TEX reliably.

Moreover, when the required torque TRQD is within the predetermined torque range included in the torque range defined by the first predetermined torque TRQTH1 and the second predetermined torque TRQTH2, that is, when the required torque TRQD is within the range which is the third predetermined torque TRQTH3 or higher but lower than the fourth predetermined torque TRQTH4, since control by which the power generation amount WACG by the ACG 32 is increased to the maximum power generation amount WACGMAX is performed, it is possible to make the motor output torque TMOT higher or lengthen the time in which the motor output torque TMOT which has been made higher is maintained. If there is not enough power to drive the motor 124, even in a state in which the required torque TRQD is lower than the second predetermined torque TRQTH2, it is necessary to perform richening of the air fuel ratio in order to avoid a breakdown. Thus, by increasing the power generation amount WACG of the ACG 32, it is possible to avoid such a situation. However, as explained with reference to FIG. 4C, if the power generation amount WACG by the ACG 32 is increased, the fuel efficiency is decreased as a result of the engine output torque to drive the ACG 32 being made higher if the required torque TRQD is near the second predetermined torque TRQTH2. For this reason, by increasing the power generation amount only within the above-described predetermined torque range, it is possible to obtain the fuel efficiency improvement effect.

In this embodiment, the ECU 30 forms an exhaust-gas temperature rise suppression unit including an air-fuel ratio richening unit.

Incidentally, the present disclosure is not limited to the above-described embodiment and may be changed and modified in various ways. For example, in the above-described embodiment, the power generation amount WACG of the ACG 32 is increased in a range in which the required torque TRQD is the third predetermined torque TRQTH3 or higher but lower than the fourth predetermined torque TRQTH4; however, the power generation amount WACG of the ACG 32 may be maintained at the normal power generation amount WACGN. Moreover, when the power generation amount WACG of the ACG 32 is increased, the maximum power generation amount WACGMAX too does not necessarily have to be increased. Furthermore, in Step S22 of FIG. 5, the additional power generation amount DWACG is calculated in accordance with the engine RPM NE and the required torque TRQD; however, the additional power generation amount DWACG may be set at a fixed value such that the power generation amount WACG to which the additional power generation amount DWACG has been added becomes the maximum power generation amount WACGMAX or smaller.

Moreover, in the above-described embodiment, as a parameter indicating the load of the engine 1, the required torque TRQD is used, but the amount of operation of an accelerator pedal AP may be used instead. Furthermore, the direct-injection engine with the four cylinders is depicted in FIG. 1, but the present disclosure is applicable irrespective of the number of cylinders and is also applicable to an engine that injects fuel into an inlet passage.

According to a first aspect of the present disclosure, in a control device of an internal combustion engine provided with a supercharger and a waste gate valve, the supercharger including a turbine provided in an exhaust passage of the internal combustion engine, a compressor that is driven and rotated by the turbine and pressurizes an intake air of the engine, and an electric motor provided so as to be capable of driving the compressor, the waste gate valve provided in a bypass passage that bypasses the turbine, the control device includes an exhaust-gas temperature rise suppression unit that drives the electric motor and makes larger the opening (WGO) of the waste gate valve in a predetermined high-load operation state in which the load (TRQD) of the engine is a first predetermined load (TRQDTH1) or higher and an excessive rise in the exhaust-gas temperature (TEX) of the engine is estimated to occur.

With this configuration, in the predetermined high-load operation state in which the load of the engine is the first predetermined load or higher and an excessive rise in the exhaust-gas temperature of the engine is estimated to occur, exhaust-gas temperature rise suppression control by which the electric motor is driven and the opening of the waste gate valve is made larger is performed. By performing driving assistance to the compressor by the electric motor in a state in which the engine load is relatively high, even when the work done by the turbine is reduced by making larger the opening of the waste gate valve, it is possible to achieve the supercharging pressure rising characteristics that are equal to the characteristics observed when the waste gate valve is closed. Since a rise in the exhaust-gas temperature can be suppressed by reducing the exhaust pressure by making larger the opening of the waste gate valve, it is possible to improve the fuel efficiency by suppressing a rise in the exhaust-gas temperature without performing richening of the air fuel ratio. Moreover, since the high-temperature residual gas in the combustion chamber is reduced as a result of a reduction of the exhaust pressure, which makes knocking less likely to occur, it is possible to reduce the amount of retardation of the ignition timing, which also contributes to the suppression of a rise in an exhaust-gas temperature.

According to a second aspect of the present disclosure, in the control device of the internal combustion engine described in the first aspect, the exhaust-gas temperature rise suppression unit may include an air-fuel ratio richening unit that richens the air fuel ratio of an air fuel mixture that is burned in the engine if the load (TRQD) of the engine is a second predetermined load (TRQDTH2), which is higher than the first predetermined load (TRQDTH1), or higher in the predetermined high-load operation state.

With this configuration, if the engine load is the second predetermined load, which is higher than the first predetermined load, or higher in the predetermined high-load operation state, richening of the air fuel ratio is performed. In an operation state in which the engine load is very high, since a higher priority has to be given to the suppression of a rise in the exhaust-gas temperature than to the prevention of a decrease in fuel efficiency, by performing richening of the air fuel ratio while driving the electric motor and making larger the opening of the waste gate valve, it is possible to prevent an excessive rise in the exhaust-gas temperature reliably.

According to a third aspect of the present disclosure, the control device of the internal combustion engine described in the second aspect may include a generator that is driven by the engine and the exhaust-gas temperature rise suppression unit may increase the power generation amount (WACG) by the generator when the load of the engine is within a predetermined load range (TRQDTH3 to TRQDTH4) included in a load range defined by the first predetermined load (TRQDTH1) and the second predetermined load (TRQDTH2).

With this configuration, when the load of the engine is within the predetermined load range included in the load range defined by the first predetermined load and the second predetermined load, since control by which the power generation amount by the generator is increased is performed, it is possible to make higher the output torque of the electric motor which is required for supercharging or lengthen the time in which the output torque which has been made higher can be maintained. Moreover, if there is not enough power to drive the electric motor, even in a state in which the load of the engine is lower than the second predetermined load, it is necessary to perform richening of the air fuel ratio in order to avoid a breakdown. Thus, by increasing the power generation amount of the generator, it is possible to avoid such a situation. However, if the power generation amount by the generator is increased, the fuel efficiency is decreased as a result of an increase in the work to drive the generator if the load of the engine is near the second predetermined load. For this reason, by increasing the power generation amount only within the above-described predetermined load range, it is possible to obtain the fuel efficiency improvement effect.

Obviously, numerous modifications and variations of the present invention are possible in light of the above teachings. It is therefore to be understood that within the scope of the appended claims, the invention may be practiced otherwise than as specifically described herein.

What is claimed is:

1. A control device of an internal combustion engine provided with a supercharger and a waste gate valve, the supercharger including a turbine provided in an exhaust passage of the internal combustion engine, a compressor that is driven and rotated by the turbine and pressurizes an intake air of the internal combustion engine, and an electric motor provided so as to be capable of driving the compressor, the waste gate valve provided in a bypass passage that bypasses the turbine, the control device comprising:

an exhaust-gas temperature rise suppression unit that drives the electric motor and makes larger an opening of the waste gate valve in a predetermined high-load operation state in which a load of the internal combustion engine is a first predetermined load or higher and an excessive rise in an exhaust-gas temperature of the internal combustion engine is estimated to occur, wherein the exhaust-gas temperature rise suppression unit includes an air-fuel ratio richening unit that richens an air fuel ratio of an air fuel mixture that is burned in the internal combustion engine if the load of the internal combustion engine is a second predetermined load, which is higher than the first predetermined load, or higher in the predetermined high-load operation state, the control device further comprising:

a generator that is driven by the engine and is capable of supplying power to the electric motor, wherein the exhaust-gas temperature rise suppression unit increases a power generation amount by the generator when the load of the engine is within a predetermined load range included in a load range defined by the first predetermined load and the second predetermined load.

2. A control device for an internal combustion engine including a supercharger and a waste gate valve, the supercharger including a compressor, and an electric motor and a turbine which are to drive the compressor, the turbine being provided in an exhaust passage of the internal combustion engine, the waste gate valve being provided in a bypass passage that bypasses the turbine, the control device comprising:

circuitry configured to
determine whether a load of the internal combustion engine is equal to or larger than a first reference load;
determine whether a temperature of an exhaust gas discharged from the internal combustion engine is expected to be higher than a reference temperature;
drive the electric motor in a high-load operation state in which the load of the internal combustion engine is determined to be equal to or larger than the first reference load and the temperature of the exhaust gas is determined to be expected to be higher than the reference temperature; and
increase an opening degree of the waste gate valve in the high-load operation state, wherein the circuitry includes an air-fuel ratio richening unit that richens an air fuel ratio of an air fuel mixture that is burned in the internal combustion engine if the load of the internal combustion engine is a second reference load, which is higher than the first reference load, or higher in the high-load operation state, the control device further comprising:

a generator that is driven by the internal combustion engine and is capable of supplying power to the electric motor, wherein the circuitry increases a power generation amount by the generator when the load of the engine is within a load range defined by the first reference load and the second reference load.

\* \* \* \* \*